United States Patent
Culley

(10) Patent No.: US 7,433,763 B2
(45) Date of Patent: Oct. 7, 2008

(54) POWER MANAGEMENT LOGIC THAT RECONFIGURES A LOAD WHEN A POWER SUPPLY FAILS

(75) Inventor: Paul Culley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 103 days.

(21) Appl. No.: 11/407,611

(22) Filed: Apr. 20, 2006

(65) Prior Publication Data

US 2007/0250218 A1 Oct. 25, 2007

(51) Int. Cl.
*G05D 17/00* (2006.01)

(52) U.S. Cl. ...................................... 700/295

(58) Field of Classification Search .............. 700/291, 700/295, 297; 713/300–321, 323, 324, 330, 713/340

See application file for complete search history.

(56) References Cited

U.S. PATENT DOCUMENTS

| | | | | |
|---|---|---|---|---|
| 4,267,500 A * | 5/1981 | Bourke et al. ................ 318/806 |
| 5,777,897 A * | 7/1998 | Giorgio ........................ 700/299 |
| 5,898,233 A * | 4/1999 | Sawaki ......................... 307/38 |
| 5,963,887 A * | 10/1999 | Giorgio ........................ 702/64 |
| 6,023,402 A * | 2/2000 | Kaminski ..................... 361/103 |
| 6,225,911 B1 * | 5/2001 | Nagamasa et al. ........... 340/635 |
| 6,259,172 B1 * | 7/2001 | Lee .............................. 307/125 |
| 6,265,790 B1 * | 7/2001 | Vogman ....................... 307/64 |
| 6,368,064 B1 * | 4/2002 | Bendikas et al. .............. 417/2 |
| 6,400,045 B1 * | 6/2002 | Hosokawa et al. ........... 307/117 |
| 6,534,995 B1 * | 3/2003 | Schell et al. ................. 324/511 |
| 6,643,128 B2 * | 11/2003 | Chu et al. .................... 361/687 |
| 6,775,162 B2 * | 8/2004 | Mihai et al. ................. 363/141 |
| 6,791,209 B2 * | 9/2004 | Aldridge et al. ............. 307/65 |
| 6,792,550 B2 * | 9/2004 | Osecky et al. ............... 713/300 |
| 6,987,370 B2 * | 1/2006 | Chheda et al. .............. 318/268 |
| 7,256,515 B2 * | 8/2007 | Liang et al. .................. 307/43 |
| 2003/0209945 A1 * | 11/2003 | Hanson ........................ 307/149 |
| 2004/0158771 A1 | 8/2004 | Garnett et al. |
| 2004/0169968 A1 * | 9/2004 | Mohr et al. .................... 361/33 |
| 2005/0067902 A1 | 3/2005 | Bemat et al. |
| 2005/0172157 A1 | 8/2005 | Artman et al. |
| 2005/0182978 A1 * | 8/2005 | Anderson et al. ........... 713/300 |

FOREIGN PATENT DOCUMENTS

JP 05201102 A * 8/1993

* cited by examiner

Primary Examiner—M. N. Von Buhr

(57) ABSTRACT

A system comprises a plurality of power supplies, a fan coupled to the power supplies, power management logic adapted to reconfigure the load to draw less power when a power supply fails and emergency logic. The emergency logic receives a status signal from each of the power supplies and, upon detecting a failure of a power supply, causes power to temporarily turn off to the fan while the power management logic reconfigures the load to draw less power.

16 Claims, 3 Drawing Sheets

POWER MANAGEMENT LOGIC THAT RECONFIGURES A LOAD WHEN A POWER SUPPLY FAILS

BACKGROUND

In at least some systems, redundantly configured power supplies are provided to power a load. If one of the power supplies, or power feed feeding a power supply fails, the remaining supply can adequately power the load so that work performed by the load is unaffected. This architecture requires each power supply to be rated high enough to meet the load's full power demand should the other supply fail. Accordingly, each power supply is rated high enough to satisfy the load's entire demand, even though most of the time (i.e., no power supply failure) each power supply need not be called on to supply that much power. Rating each power supply to meet the load's full demand although each supply need not supply that much power in failure-free periods of time means that each supply, most of the time, has unused excess capacity and thus is larger and more costly than is typically needed.

BRIEF DESCRIPTION OF THE DRAWINGS

For a detailed description of exemplary embodiments of the invention, reference will now be made to the accompanying drawings in which:

FIG. 5 shows an alternative method embodiment.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers broadly to a collection of two or more components and may be used to refer to an overall system (e.g., a computer system or a network of computers) as well as a subsystem provided as part of a larger system (e.g., a subsystem within an individual computer).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
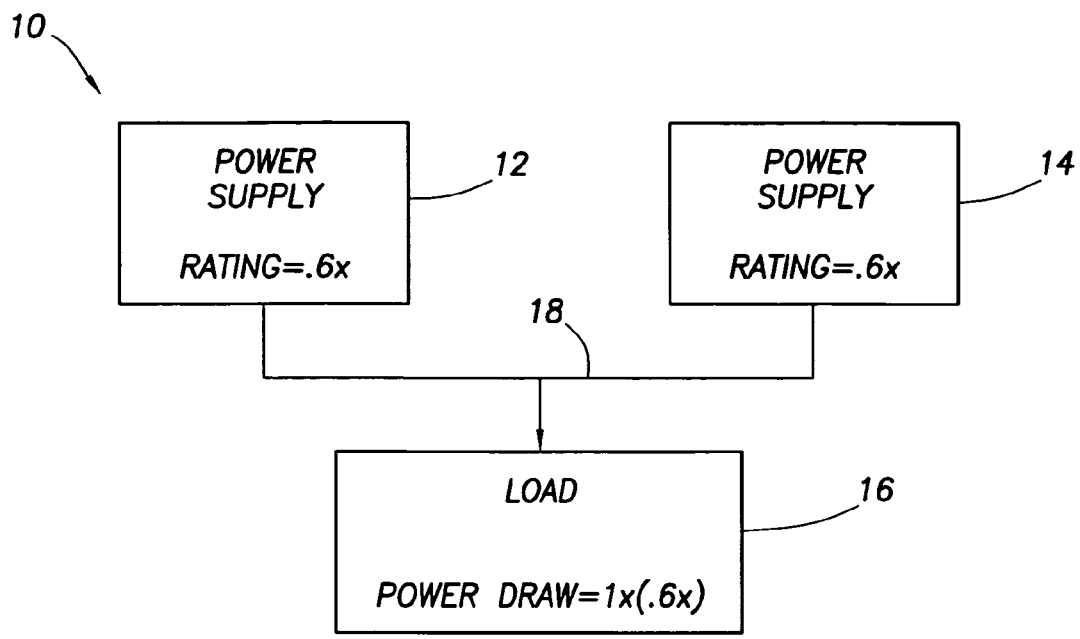
FIG. 1 shows a system comprising a load powered by a plurality of power supplies in accordance with embodiments of the invention.

FIG. 1 shows a system 10 comprising a plurality of power supplies 12 and 14 coupled to and providing power to a load 16 over power pathway 18. Power pathway 18 may comprise one or more conductors (e.g., a power cable), traces on a printed circuit board, a bus bar, or other suitable mechanisms for delivering power to the load 16. Although two power supplies 12 and 14 are shown, in other embodiments more than two power supplies can be provided.

The load 16 may comprise a computer (e.g., a server), a storage drive, a fan, or other type of electrical load. The load 16 can be configured to operate in any of a plurality of modes of operation. For example, the load may have a higher performance mode of operation and a lower performance mode of operation. More than two modes of operation can be provided for the load as desired. In some embodiments, the load may comprise a computer and have a fully operational mode of operation and lower performance mode in which the computer's processor is throttled back (e.g., clock speed reduced). The computer continues to operate in this lower performance mode, but not as fast as in the higher performance mode. The lower performance mode may comprise turning off a disk drive in or coupled to the load. Further, the lower performance mode may comprise generally shutting the load off but retaining the capability to re-awaken the load when appropriate.

The power supplies 12 and 14 collectively provide the operational power required by the load. Thus, when both power supplies are working correctly, each supply need not provide all of the power required by the load. However, when one of the power supplies fails, the load is reconfigured to operate in a lower performance mode. The remaining operational power supply supplies all of the power required by the load, but the load requires less power than when the load was in the higher performance mode of operation. As a result, each power supply 12, 14 need not be rated to satisfy the power demand required by the load when in the higher performance mode. Moreover, each power supply 12, 14 can be rated at a lower level and thus be physically smaller and less costly than would otherwise be required.

By way of example, and referring still to FIG. 1, the load 16 in the higher performance mode has a power draw equal to "1×," in terms of wattage or current. Each power supply is rated to a level less than 1×. In the example of FIG. 1, each power supply is rated to a level of 0.6×. With each power supply rated to 0.6× and the load requiring 1× power, the power supplies 12, 14 combined have a rating of 1.2×, which is more than enough to power the load.

When one of the power supplies fails or an AC power feed feeding a power supply fails, however, the load is reconfigured to the lower performance mode. Alternatively stated, when one of the power supplies fails, the load is reconfigured to draw less power. In the example of FIG. 1, the lower performance mode reduces the power demand of the load to 0.6×, which is indicated in parentheses. Because the remaining operational supply is rated to 0.6×, the remaining operational supply can satisfy the power demand of the load. Accordingly, the rated power capacity of each supply should be set at a level that is sufficient to power the load in the lower performance (i.e., power) mode. Moreover, each supply need not be rated at 1× and instead can be manufactured to a lower rating, thereby enabling the supplies to be smaller and cheaper than otherwise would be required if each supply was rated at 1×. If desired, each power supply may have a rating that includes some margin. In the example above, each supply may have a rating of, for example, 0.7× to provide some margin relative to a load that draws 0.6× power.

When the failed supply is subsequently repaired or replaced, the failure mode ceases to be present and the load is again reconfigured to the higher performance mode. Further still, the system 10 or 20 may have initially been configured to operate from a single power supply. Thus, when a second supply is added, the introduction of the second supply causes the load to be configured to a higher performance mode.

Figure 2:
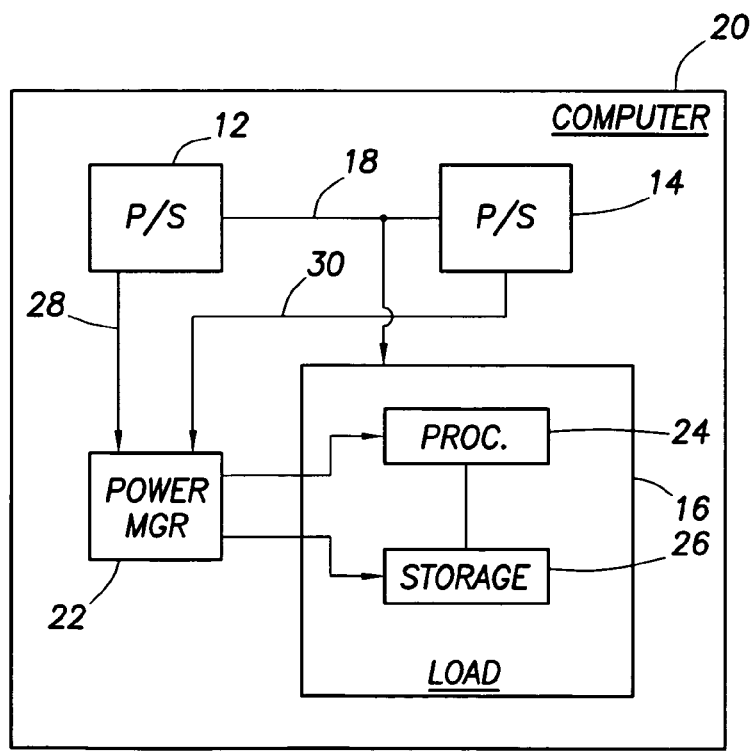
FIG. 2 shows a computer system in accordance with embodiments of the invention.

FIG. 2 illustrates an embodiment of the architecture described above implemented within a computer 20. As shown, computer 20 comprises power supplies 12 and 14 coupled to load 16. The load 16 comprises components typically found in a computer such as a processor 24, storage drive 26, etc. Computer 20 also comprises power management logic 22, which receives status signals 28 and 30 from power supplies 12 and 14, respectively. Each status signal 28, 30 provides an indication as to whether its associated power supply is operational. In at least one embodiment, the status signal indicates that the associated power supply is fully operational or that the power supply has failed.

If one of the power supply status signals 28, 30 indicates a failure of a power supply, the power management logic responds to such failure by reconfiguring the load 16 to operate in a lower performance mode (i.e., draw less power). This load reconfiguration can be accomplished by throttling down the processor 24, spinning down the storage drive 26, which may comprise a hard disk drive, and/or other suitable reconfiguration technique.

Figure 3:
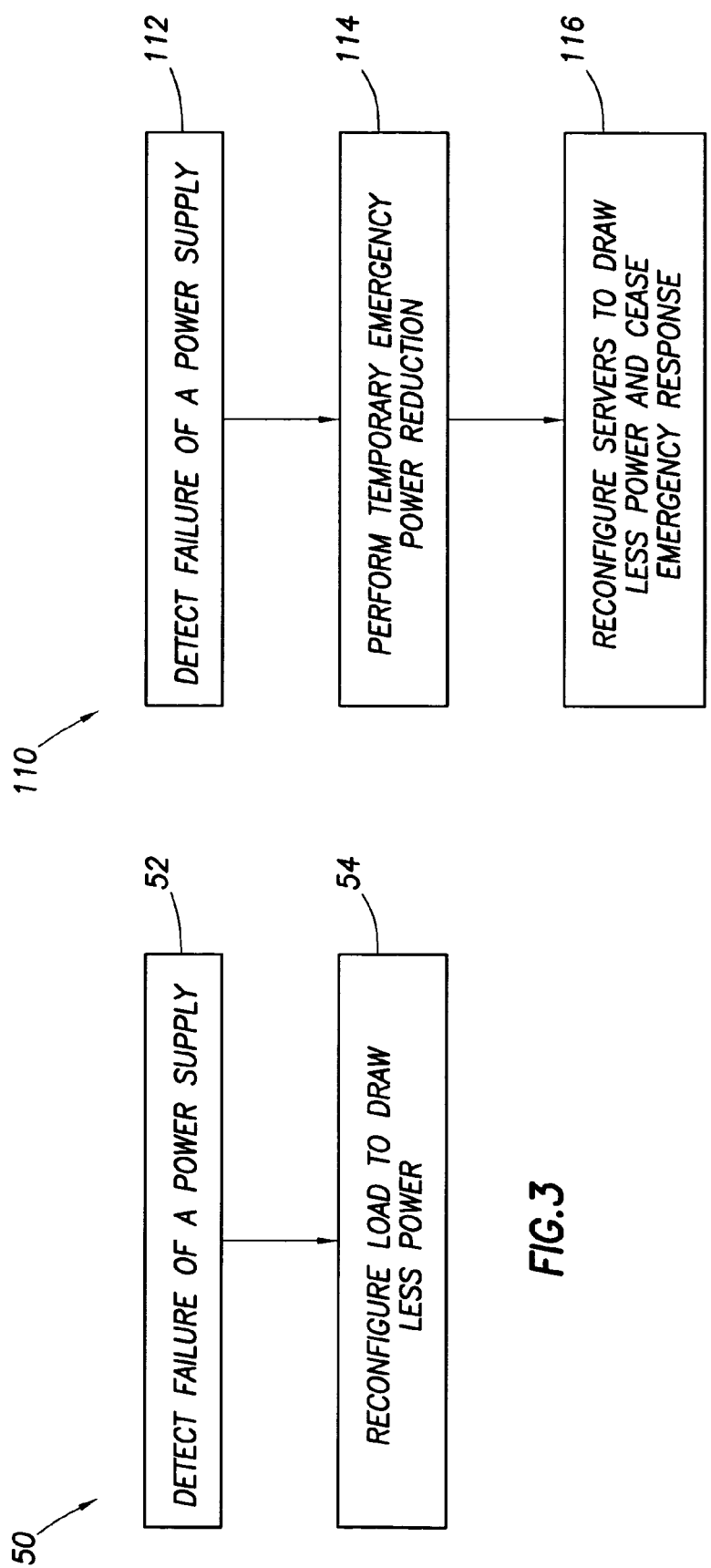
FIG. 3 shows a method embodiment in accordance with embodiments of the invention.

FIG. 3 illustrates a method 50 comprising at least actions 52 and 54. At 52, the method comprises detecting a failure of a power supply from among a plurality of power supplies. In response to detecting the power supply failure, at 54 the method comprises causing the load to be reconfigured to operate in the lower performance mode. As noted above, this process reverses itself when the failed supply is repaired or replaced. That is, the load is reconfigured back to the higher performance (i.e., power) mode.

Figure 4:
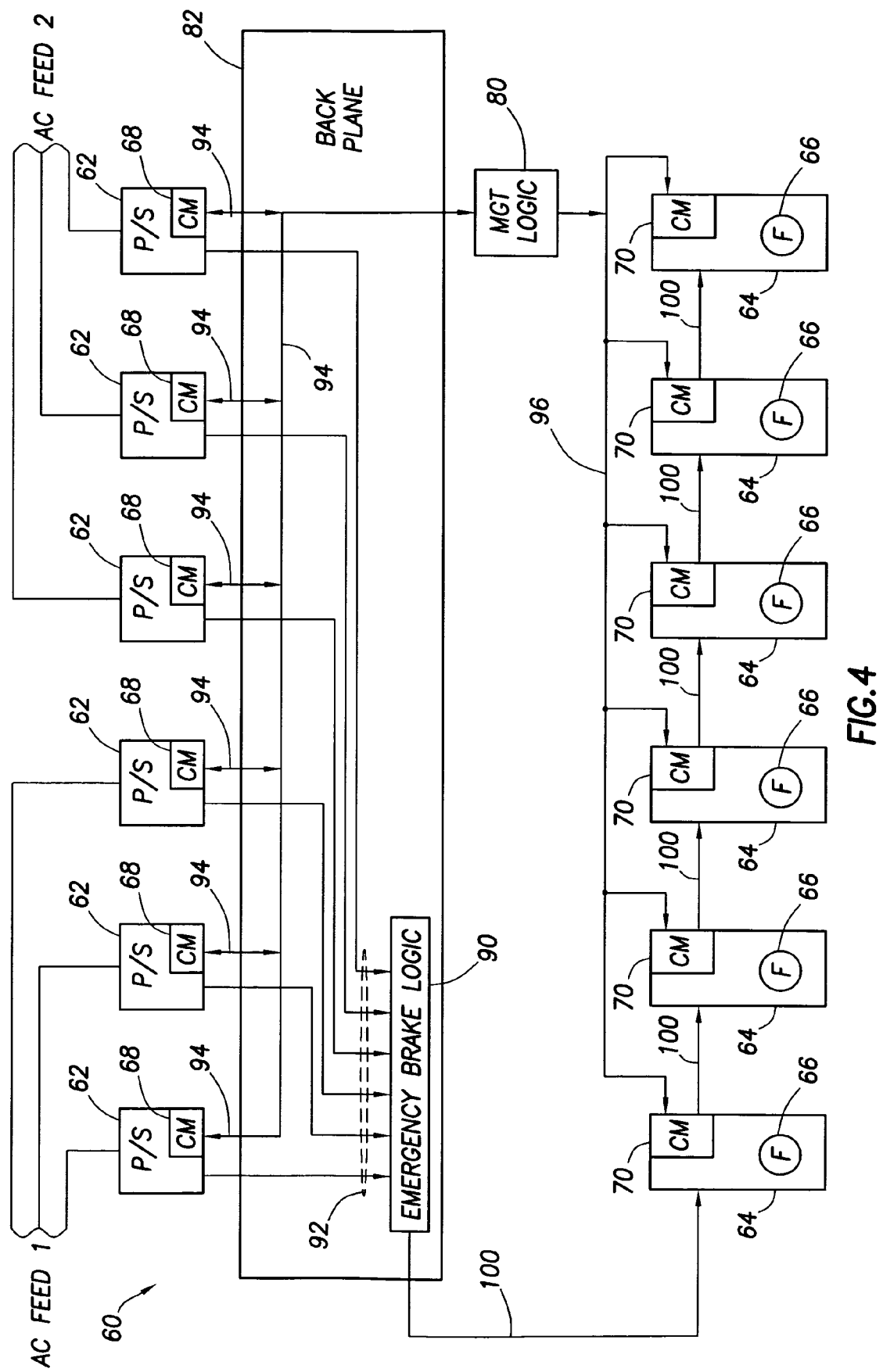
FIG. 4 shows another system comprising a plurality of loads in accordance with embodiments of the invention.

FIG. 4 illustrates a system 60 comprising a plurality of power supplies 62 and a plurality of loads 64 coupled to and receiving power from the power supplies 62. System 60 also comprises management logic 80 and "emergency brake" logic 90. The management logic 80 couples to the power supplies 62 via communication links 94 and to the loads via communication links 96. The emergency brake logic 90 couples to the power supplies via status signals 92 and to the loads 64 via brake signal 100.

Power from the power supplies 62 is aggregated and supplied to the loads via a backplane 82. The power connections are not shown in FIG. 4 for sake of simplicity. The three left-hand power supplies 62 receive an alternating current (AC) power feed 1 that is separate from AC power feed 2 for the right-hand power supplies. If AC feed 1 fails, the three left-hand power supplies 62 will turn off and the three right-hand power supplies will have to supply the power needs of the loads 64.

In some embodiments, each load 64 comprises a computer such as a server computer. Each load 64 includes or is coupled to (i.e., is associated with) a fan 66 as shown and a configuration management module 70 to enable communications with the management logic 80. In accordance with various embodiments, the load 64 more broadly could be a computer, a fan or a computer with an integrated fan. Similarly, each power supply 62 also comprises a configuration management module 68 to enable communications with the management logic 80. Via the management logic modules 68 and 70, the management logic 80 can configure the power supplies 62 and loads 64. The management logic 80 can, for example, configure the performance (i.e., power) mode of each load 64 by sending a signal (e.g., a message) on communication links 96 to the loads 64. Accordingly, when a power supply 62 or group of power supplies fails, the management logic 80 transmits signals to the loads 64 to transition to a lower power mode that is within the combined power rating of the remaining operational power supplies. If three power supplies remain operational, the management logic 80 transmits signals to the loads 64 to transition to a lower power mode that is within the combined power rating of the remaining three operational power supplies. The management logic 80 is preprogrammed with the power ratings of the power supplies so that management logic 80 can transition the loads to the appropriate mode. The management logic 80 becomes aware of the failure of one or more supplies by way of status information received from the supplies' configuration management modules 68 (or the cessation of expected status information).

In some embodiments, by the time it takes the management logic 80 to reconfigure the loads 64, the power supply or group of supplies may have already ceased providing power. Many power supplies have a characteristic that the output direct current (DC) voltage level falls gradually over time upon cessation of operation of the power supply. This gradual drop off of the power supply's may take, in some embodiments 4 or 5 milliseconds. Thus, there is a finite, albeit short, period of time in which the power supply continues to provide usable output power despite a failure of the supply. It may take the management logic, however, more than 4 or 5 milliseconds, or however much time the failed power supply's output voltage remains viable, to effectuate the change in performance/power mode of the loads.

To solve this problem, the emergency brake logic 90 is provided to cause a temporary emergency response in the loads 64 to draw less power before the management logic 80 completes reconfiguring the loads. The emergency brake logic 90 receives status signals 92 from the power supplies. Each status signal indicates whether the corresponding power supply is functional. In other embodiments, the status signals are wired together with a single status input signal provided to the emergency brake logic 90. At any rate, once the emergency brake logic 90 detects that at least one of the power supplies has failed, the emergency brake logic 90 generates an emergency response signal 100, which is provided to each of the loads as shown. In some embodiments, the emergency response signal 100 causes power to the fan 66 of each load to be turned off, at least temporarily. The inertia of the fans keeps the fans spinning, albeit decelerating, thereby continuing to provide some limited thermal benefit. Once the management logic 80 has reacted to reconfigure the loads 64 for the lower performance/power mode, the emergency brake logic 90 ceases assertion of the emergency brake signal thereby permitting the fans to resume normal operation. Consequently, power is turned off to the fans just long enough to permit the management logic 80 time to react to the power supply, but not long enough to cause damage to the loads. Other types of emergency responses may be implemented as well.

The emergency response is generally a hardware-based response mechanism that bypasses the normal performance/power mode reconfiguring mechanisms. The emergency response gives the normal load reconfiguration process sufficient time to occur in the face of a rapidly diminishing output voltage being experienced by a failed power supply.

The emergency response sufficiently lowers the power demand of the loads to permit the loads to receive reconfiguration commands from the management logic 80 and react accordingly before the failed supply(ies) output voltage falls too low to be usable to the loads.

FIG. 5 illustrates a method 110 comprising at least actions 112, 114, and 116. At 112, the method comprises detecting a failure of a power supply from among a plurality of power supplies. In response to detecting the power supply failure, at 114 the emergency brake logic 90 performs an action to cause a temporary power reduction on the loads. At 116, the method then comprises the management logic 80 to reconfigure the loads 64 to draw less power. Finally, the emergency response is ceased once the load reconfiguration has occurred.

The above discussion is meant to be illustrative of the principles and various embodiments of the present invention. Numerous variations and modifications will become apparent to those skilled in the art once the above disclosure is fully appreciated. For example, the emergency brake logic 90 could force a processor in each load 64 (e.g., server) to a low-power state, while the management logic 30 otherwise reconfigures the load 64. It is intended that the following claims be interpreted to embrace all such variations and modifications.

What is claimed is:

1. A system, comprising:
    a plurality of power supplies configured to power a load;
    a fan coupled to said power supplies;
    power management logic adapted to reconfigure said load to draw less power when a power supply fails; and
    emergency logic that receives a status signal from each of said power supplies and, upon detecting a failure of a power supply, causes power to temporarily turn off to said fan while said power management logic reconfigures said load to draw less power.

2. The system of claim 1 wherein said power management logic is adapted to detect the failure of a power supply and reconfigure said load to draw less power upon detecting the failure.

3. The system of claim 1 wherein said load comprises a processor.

4. The system of claim 1 wherein said load comprises a storage device.

5. The system of claim 1 wherein said power management logic is adapted to reconfigure said load to draw more power when the failed supply is replaced or repaired.

6. The system of claim 1 wherein the load is reconfigured to operate at lower performance thereby drawing less power when a power supply fails.

7. The system of claim 1 further comprising a plurality of fans and said emergency logic causes power to temporarily turn off to all of said fans while said power management logic reconfigures said load to draw less power.

8. The system of claim 1, wherein said fan is turned back on upon completion of said power management logic reconfiguring said load to draw less power.

9. A system, comprising:
    a plurality of power supplies;
    a plurality of loads coupled to said power supplies;
    a plurality of fans coupled to said power supplies, each associated with a separate load;
    management logic coupled to said plurality of power supplies and to said plurality of loads, said management logic, in response to a failure of a power supply, configuring said loads to draw less power; and
    emergency logic coupled to said power supplies and to said loads, said emergency logic causing power to said fans to temporarily turn off before the management logic completes reconfiguring said loads to draw less power.

10. The system of claim 9 wherein each load comprises a computer.

11. The system of claim 10 wherein said fans are turned back on upon completion of said management logic configuring said loads to draw less power.

12. A method, comprising:
    a plurality of power supplies providing power to a load;
    detecting a failure of a power supply;
    in response to detecting said power supply failure, causing said load to be re-configured to operate in a lower performance mode; and
    while or before said load is being re-configured to operate in a lower performance mode, causing power to a fan associated with said load to turn off temporarily.

13. The method of claim 12 wherein in response to detecting said power supply failure, causing said load to be re-configured to operate in a lower performance mode to thereby cause said load to draw less power.

14. The method of claim 12 further comprising said plurality of power supplies providing power to a plurality of loads and the method further comprising, in response to detecting said power supply failure, first causing a component in said load to turn off and then reconfiguring said load to operate in said lower performance mode.

15. The method of claim 12 further comprising causing said load to again be re-configured to operate in a higher performance mode upon no longer detecting said power supply failure.

16. The method of claim 12 further comprising causing power to said fan to turn on once the load has been reconfigured to operate in a lower performance mode.

* * * * *